Patented Dec. 16, 1930

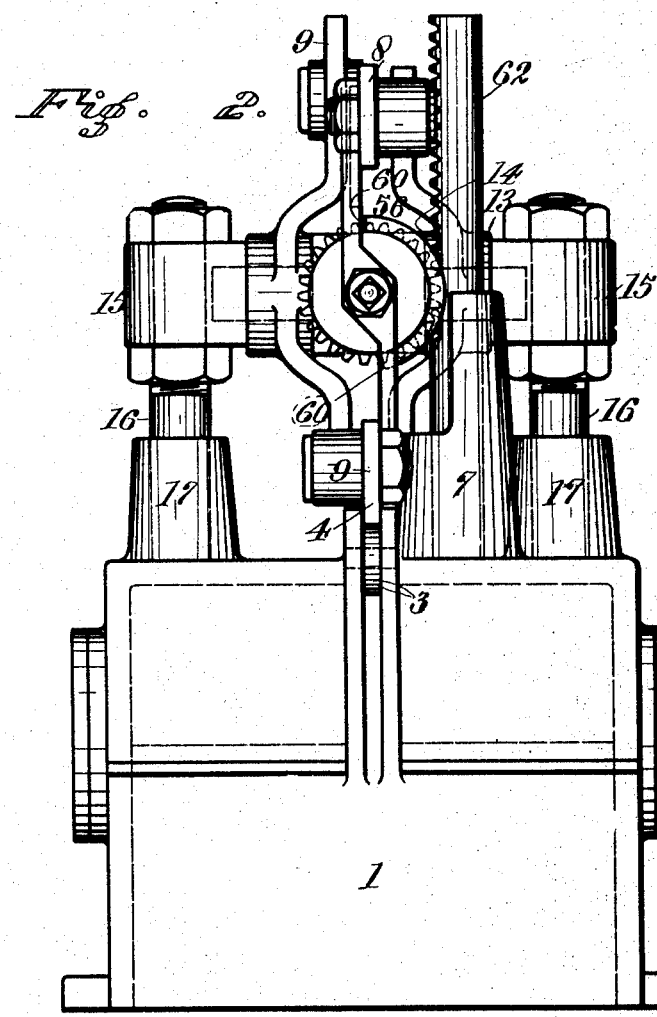

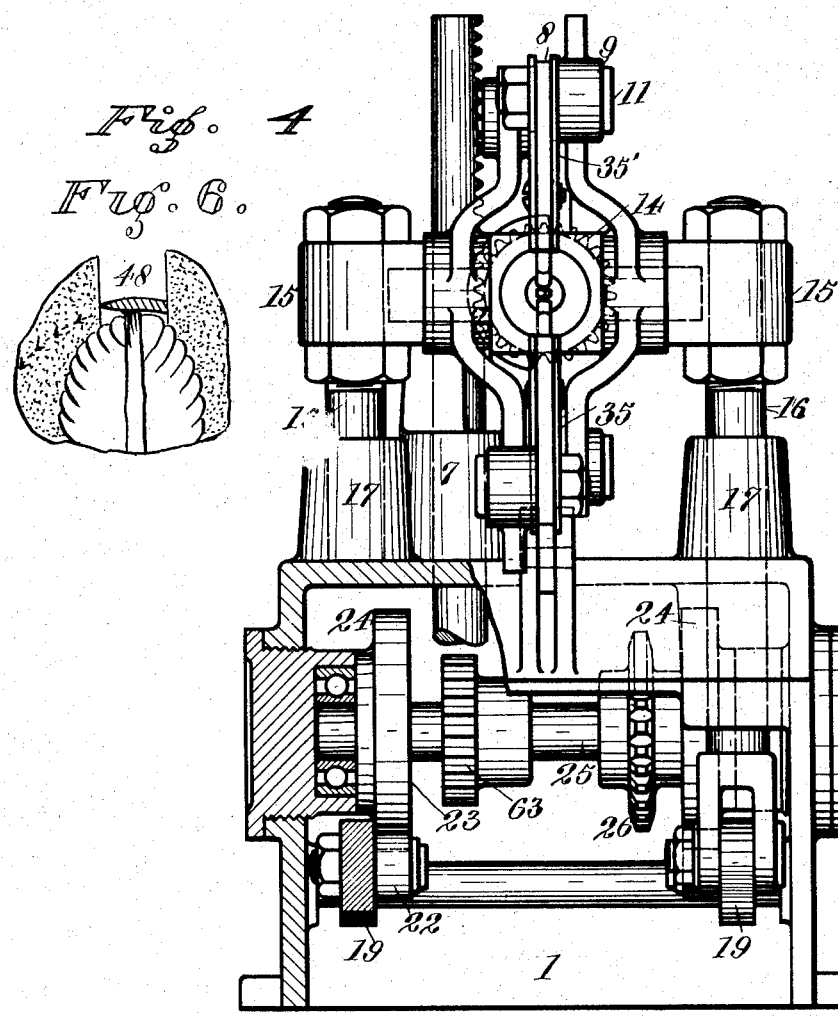

1,785,022

UNITED STATES PATENT OFFICE

ARTHUR L. DUNCAN, OF OAKLAND, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT-PITTING MACHINE

Application filed December 16, 1924. Serial No. 756,175.

The present invention relates to an apparatus for removing the pit or core from a fruit and particularly to an apparatus for removing a pit or core from a fruit from which a circumferential slice has been preferably cut to the depth of the pit to provide two half sections, adhering to each side of the pit or core.

The invention consists in a pair of pitting knives mounted and operated in a particular manner, and in a fruit guiding means mounted and operated in a particular manner for reception in the groove of the fruit to hold the same from turning and to properly position the stone thereof relatively to the pitting knives, there being maintained means for insuring the pitting knives arriving at a point of rest in a predetermined position in parallel alignment with the positioning means.

The invention further consists in providing a mechanism which is capable of easy operation by an attendant, by the employment of which a number of fruits may be pitted within a comparatively short time and which is capable of pitting fruit at a greater speed than at present accomplished by the hand pitting method, and one wherein a uniform pitting of the fruit is present in all cases.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings, disclosing the preferred embodiment of my invention—

Fig. 2 is a view in rear elevation.

Fig. 3 is a view in top plan.

Fig. 4 is a view in front elevation, partly in section.

Fig. 5 is a view in longitudinal section of the pit knife mounting means illustrating the reciprocating rod for moving the knife to open or close position, and the clutch mechanism between the spindle and spindle driving means.

Fig. 6 is a fragmentary transverse sectional view of one of the pitting knives.

Figure 1:
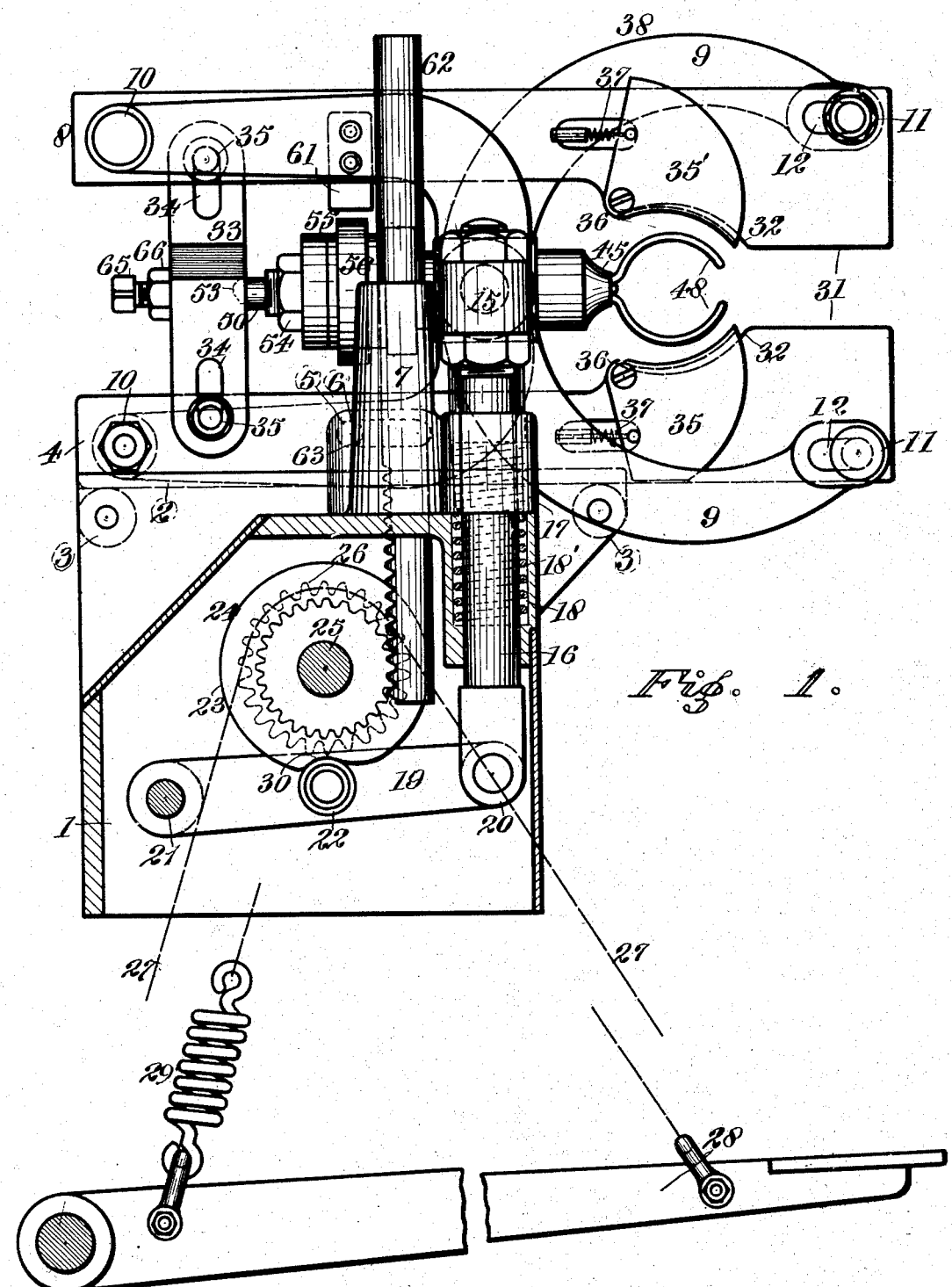
Fig. 1 is a view in side elevation, partly in section, with the parts in open position.

In the drawings, wherein like characters of reference designate corresponding parts, 1 indicates a base of any suitable type and configuration, provided on its upper surface with a guide slot 2, at the forward and rear ends of which are mounted the guide rollers 3 on which slide the lower edge of a bed plate 4, the lower edge of which is received in the groove 2. The bed plate 4 is provided with a longitudinal slot 5 through which extends a bolt 6, and secured to the upstanding tubular extension 7 rising from the upper surface of the base 1, offset to one side of the slot 2. The bolt 6 limits the longitudinal movement of the bed 4 and maintains the same in a vertical position.

Disposed in parallel spaced relation above the bed 4 is the corresponding member or plate 8, the same being held in position and connected at its opposite ends with the opposing ends of the bed 4 by the reversed curved connecting plates 9 disposed in parallel relation, one on either side of the bed 4 and member 8, and connected at the rear ends of the bed 4 and member 8 by the fixed fulcrum members 10. The connection between the forward ends of the members 9 and the bed 4 and member 8 is through fulcrumed members 11 carried by the respective members 4 and 8 and extending into elongated slots 12 in the outer end of the respective members 9. The members 9 midway of their length and at their point of crossing are connected as at 13 by a cross head 14, the ends of which are fulcrumed in and extend laterally from the heads 15 mounted at the upper ends of the vertically reciprocating members 16 movable within guides 17 in the upper wall of the base 1.

Springs 18 coiled about the bases of the members 16 and received in guides 18' normally maintain the members 16 in elevated position. Levers 19 pivotally connected as at 20 with the lower ends of the respective members 16 are fulcrumed at their opposite ends within the base 1, as at 21, and each carry midway of their length an idler 22 which ride on the periphery 23 of suitable cam disks 24 carried by the rotary power shaft 25. The shaft mounts a sprocket 26 over which extends a chain 27, the forward end of which is connected to a foot pedal 28 and the rear end of which is connected to the same pedal 28 by a spring 29; the periphery of the disks 24, formed with indentations 30 for receiving the idlers 22 admitting of the springs 18 to raise the members 16 and maintain the member 8 normally in elevated spaced relation above the bed 4.

The members 4 and 8 at their outer ends are provided with parallel portions 31, and in rear thereof adjacent edges are correspondingly cut away on a curve, as at 32, to provide a recess for receiving the pit, core or stone of a positioned fruit.

The rear ends of the members 4 and 8 are spaced at a distance from each other and are connected by a guide plate 33 slotted at its ends, as at 34, in which slots are received guide screws 35, one projecting laterally from the respective members 4 and 8.

The curved cut-away portions 32 of the members 4 and 8 carry the protecting or face plates 35', substantially U-shaped in cross section, to afford a side portion for extending over each side wall of the respective side portions.

The rear corner of the plates 35' are fulcrumed as at 36 to the respective members 4 and 8, and to maintain the forward free edges of the plates extended outwardly, the spring 37 bearing against the rear edge of the plates and one carried in the recess 38 in the respective members 4 and 8, are provided.

The above described mechanism comprises the guide and holding means for the fruit to be pitted, and which means, particularly the walls 31, normally lie in open position, as in Fig. 1, to admit of their passing a fruit pit or core having adhering, to opposite sides thereof, any severed portions of the fruit body or pulp.

The cross head 14 is provided with a bore 39 into which extends a sleeve 40 flanged midway of its length, as at 41, and the forward portion of the flange abutting against the rear face of the cross head, as in Fig. 5.

Within the sleeve 40 is inserted the shank portion 42 of a tubular spindle, the head 43 of which abuts against the forward portion of the cross head 14, and the forward end of sleeve 40. The outer end of the spindle 43 is of substantially conical formation as at 44 and is covered by a removable cap 45 the terminal wall of which is of substantially conical formation to extend parallel with the walls 44 in spaced relation outwardly therefrom, providing a channel 46 therebetween.

Slidable within the channel 46 at diametrically opposite points on the end of the spindle are the curved inner ends 47 of the pitting knives 48, the cutting portions of which are semicircular in side elevation and when in open position normally lie with their free ends in spaced relation to admit of the passing of a pit therebetween.

Reciprocably mounted within the tubular bore of the spindle is an operating rod 50 normally held inwardly by a spring 51 coiled about the same, and the outer flattened end thereof is formed on opposite sides with projections 52 adapted for reception within corresponding projections 53 in the inner surface of the curved portions 47.

The reciprocation of the member 50 will cause a sliding movement of the ends 47 of the pitting knives in the guide 46 and a consequent separation and drawing together of the free terminal ends thereof.

On the inner threaded end of the spindle is mounted a nut 54 and the same maintains the forward end of the sleeve 40 in contact with the rear end of the head 43 of the spindle. The rear end of the sleeve is threaded and carries a nut 55, between which and the flange 40, is mounted a peripherally toothed gear 56 rotatable on the sleeve between the nut and a spring dog housing member 57 lying adjacent thereto. The member 57 carried a plurality of outwardly spring pressed spherical members 58 for reception within recesses 59 in the rear face of the member 56. This clutch construction is provided to preclude the breaking of the pitting knives 48 should the same, on the rotation of the spindle, encounter a portion of the pit. This clutch construction will yield and permit the gear 56 to rotate about the spindle.

The periphery of the member 57 is cut away to provide stop shoulders 60, and as the member 57 maintains the same in relative position at all times about the shell 40 and spindle 42, the contact of said shoulders 60 with the stop lug 61 projecting below the surface of the member 8, limits the rotative movement of the spindle and its associated fixed parts in either direction.

The reciprocating rack bar 62 operating in the guide 63 extending upwardly from the base 1 at one side of the spindle and its associated parts has engagement at its upper end with the gear 56 and at its lower end intermeshes with the teeth of a gear 63 carried on the shaft 25. The rear end of spindle 50 is circular in cross section as at 64 and is received in a recess in the member 33 to abut against the inner end of an adjustable screw member 65 threaded into the member 33 and held in its adjusted position by a lock nut 66.

The apparatus being assembled as in the drawings and the parts being in a position as indicated in the drawings, the same operates in the following manner.

In removing a pit from a peripherally grooved or channeled fruit, the operator aligns the grooves of the fruit with the edges 31 of the members 4 and 8 and moves the same longitudinally thereof, said pit being received between the pit removing knives 48. The foot pedal or lever 28 is then depressed, rotating the shaft 25, the movement of which first expels the idler 22 from the cam recess 30, this action drawing the members 16 downwardly against the action of their spring 18 and causes a lowering of the member 8 toward the member 4 until the edges 31 of the members are in contacting or substantially contacting relation. This closing movement causes a rearward reciprocation of the members 4 and 8 on the bed 1 and relieves the pressure on the end 64 of the rod 50 of the spindle, permitting the action of the spring 51 to close the knives 48 snugly about the pit.

Continued rotation of the shaft 25 by the downward movement of the foot pedal 28 imparts rotation through the rack bar 62 and gear 56 of the sleeve 40 and spindle 42. This rotation causes a rotation to be imparted to the knives 48 about the pit, severing the pit from the fruit half sections, which at this time lie one on either side of the members 35'. The pit is yieldably held between the members 35' and the knives 48, in their rotation, each making a half of a revolution.

The operator releases pressure on the pedal 28 and the spring 29 returns the parts to their open position. During this movement, shaft 25 is operated in a counter-clockwise direction, positioning the cam notch 30 to receive the idler 22, permitting springs 18' to separate the members 4 and 8 and move the same forwardly in the groove 2. This forward movement causes the screw 65 to impart a forward movement to rod 50 which in turn actuates the knives 48 to move forwardly in their grooves or channels 46 and their ends become separated to lie in open position.

The reciprocation of the members 4 and 8 across the base 1 causes a corresponding forward and rearward movement of the member 33, but it will be noted that the member 39 remains stationary. The adjustment of the screw 65 carried by the member 33 and bearing against the end of member 64 controls the degree of opening and closing of the knives 48. Thus the adjustment of the member 65 will permit the closing of the members 48 to a certain point around the positioned pit dependent on the variety of the particular fruit being halved and pitted. In the case of certain varieties of peaches, it is desirable to remove with the pit a certain portion of the reddish pulp surrounding the pit, and in this case the screw 65 is adjusted so that the knives 48 when in closed position cut deeply into the pulp leaving a considerable portion adhering to the pit.

It will also be observed in Fig. 6 that the inner surface of the pitting knives in cross section are bevelled outwardly towards the cutting edge to provide a bearing shoulder resting on the pit and preventing the cutting edge from cutting into the stone or pit during the rotation of the knives while severing the stone from the fruit.

I claim:—

1. A fruit pitting apparatus comprising a base, a spindle rotatably carried thereabove, a pair of curved pitting knives extended outwardly from the end thereof, means for moving the knives longitudinally relatively to the spindle to move their ends to and from each other, and means for revolving the spindle.

2. A fruit pitting apparatus comprising a base, a spindle rotatably carried thereabove, a pair of curved pitting knives extending outwardly from the end thereof, said knives mounted to rotate therewith and for movement longitudinally thereof, a rod within the spindle having operating connection with the knives for imparting longitudinal movement only thereto, means for imparting rotation to the spindle, and means for imparting longitudinal movement to the rod.

3. A fruit pitting apparatus consisting of a base, a spindle rotatably carried thereabove and held from longitudinal movement, a spring held rod within the spindle and longitudinally movable therein, a pair of curved pitting knives extending from one end of the spindle and at their base having operating connection with the rod, means for rotating the spindle, and means for imparting longitudinal movement to the rod to operate the knives to separate the ends thereof on the spindle arriving at a point of rest in a predetermined poistion.

4. A fruit pitting apparatus comprising a base, a spindle rotatably carried thereby and held from longitudinal movement, a pair of fruit pitting knives carried by the spindle and projecting beyond the end thereof, means for opearting said knives to cause the free ends to move to and from each other into open and closed position, a reciprocating spindle operating member, a yieldable connection between the member and spindle, and means for operating the reciprocating spindle operating member.

5. A fruit pitting apparatus including a pair of fruit guiding members normally lying with their guiding ends in spaced relation and one movable to and from the other into open and closed position, cooperating edges of said guiding members inwardly from their ends being cut away to provide a pit receiving recess, means for operating the guiding members, a rotatably mounted spindle projecting into the pit receiving recess and held from longitudinal movement, a pair of pitting knives carried by the spindle within said pit receiving recess and adapted for movement relatively to and from each other into open and closed position, and means for rotating the spindle with said knives when the same and said pit guiding members are in closed position.

6. A fruit pitting apparatus including a pair of curved pitting knives disposed opposite each other and mounted for movement to and from each other into open and closed position, means for mounting said knives to rotate in a fixed path and from the end of which said knives project, means for supporting said knife mounting means, a pair of guiding members disposed in spaced relation one on either side of said pair of pitting knives, means for moving said guiding members longitudinally of said knife mounting member into open and closed position, and means for moving said knives to open position on the movement of said guiding members to a like position.

7. A fruit pitting apparatus including a pair of rotatably mounted curved pitting knives disposed opposite each other and mounted for movement to and from each other into open and closed position, means for mounting said knives to rotate in a fixed path and from the end of which said knives project, means for supporting said knife mounting means, a reciprocating bed on said supporting means, a pair of guiding members disposed in spaced relation one on either side of said pair of pitting knives, means for moving said guiding members longitudinally of said knife mounting member into open and closed position, means for moving said knives to open position on the movement of said guiding members to a like position, and means for bringing said knives to a point of rest in open position in alignment with said guiding members.

8. A fruit pitting apparatus including a pair of fruit guiding members disposed in spaced relation with their opposing edges cut away to provide a pit receiving recess, means for moving said members to open and closed position, pit removing means rotatably mounted within said pit receiving recess, means for operating said pit removing means, and a yieldable face plate associated with the cut away portion of each member.

9. A fruit pitting apparatus including a pair of fruit guiding and positioning members, pit removing members rotatably mounted between the same, operating means for rotating the pit removing members, and a yieldable power transmitting connection between the operating means and the pit removing means.

10. A fruit pitting apparatus comprising a base, a spindle rotatably carried thereby, a pair of pitting knives extending outwardly from the end thereof, means for moving the knives longitudinally relatively to the spindle to move their ends to and from each other, means for revolving the spindle, and operating mechanism adapted to coact with said knife moving means whereby in the adjustment of said operating mechanism the movement of said knives to and from each other may be varied.

11. A fruit pitting apparatus including a pair of fruit guiding members normally lying with their guiding ends in spaced relation and one movable to and from the other into open and closed position, the co-operating edges of said guiding members inwardly from their ends being cut away to provide a pit receiving recess, a rotatably mounted spindle projecting into the pit receiving recess and held from longitudinal movement, a pair of pitting knives carried by the spindle within said pit receiving recess and adapted for movement to and from each other into open and closed position, means for rotating the spindle with said knives when the same and said pit guiding members are in closed position, means for moving said guiding members longitudinally of the spindle, and adjustable mechanism carried by the guiding members for varying the degree of opening and closing of said knives.

12. A fruit pitting apparatus including a pair of rotatably mounted curved pitting knives opposing each other and movable to and from each other into open and closed position, means for mounting said knives to rotate in a fixed path and from the ends of which said knives project, means for operating said knives to automatically adjust their movement to fit the varying sizes of fruit pits and to hold their cutting course at such automatically adjusted position, fruit guiding members, yielding fruit holding members carried thereby adapted to yield with the knives to adjust themselves to the various sizes of fruit pits or stones.

13. A fruit pitting apparatus including a pair of rotatably mounted yieldably held adjustable curved pitting knives, the inner surface of said knives in cross section being bevelled outwardly towards the cutting edge to provide a bearing shoulder for riding on the pit to prevent said cutting edge from cutting into the stone or pit during its course of travel while severing the stone or pit from the fruit.

14. A fruit pitting apparatus including a rotatably mounted yieldably held adjustable curved pitting knife, the inner surface of which in cross section is beveled outwardly towards its cutting edge to provide a bearing shoulder for riding on the pit to prevent the cutting edge from cutting into the stone or pit during its course of travel while severing the stone or pit from the fruit, and means for moving the knife circumferentially about the pit.

15. A seeding or coring machine comprising a pair of revolvable knives, a plate above said knives, a second plate below said knives, means to converge and diverge said plates about the seed in the grooved fruit, and means to rotate said knives, and means to adjust said knives about the seed or core.

16. A seeding or coring machine comprising a pair of revolvable knives, a plate above said knives, a second plate below said knives, means to converge and diverge said plates about the seed in the grooved fruit, and means to rotate said knives, a rod, means coupling said rod and said knives, and a spring urging against said rod, tending to converge said knives.

17. A seeding or coring machine comprising a lower plate, an upper plate, arms directly coupling said plates, means to depress said arms to converge said plates, a revolvable knife mounted between said plates, and means to revolve said knife.

18. A seeding or coring machine comprising a lower plate, an upper plate, arms coupling said plates, means to depress said arms to depress said upper plate, and simultaneously move said upper and lower plates rearwardly, a revolvable knife mounted between said plates, means coupling said plates and said knives whereby said knives are contracted as the plates move rearwardly.

19. A seeding or coring machine comprising a lower plate, an upper plate, arms coupling said plates, means to depress said arms to depress said upper plate, and simultaneously move said upper and lower plates rearwardly, a revolvable knife mounted between said plates, a rod, means coupling said knives and said rod, a spring acting against said rod, a link coupling said plates, said rod extending to said link.

20. A seeding or coring machine comprising a lower plate, an upper plate, arms coupling said plates, means to depress said arms to converge said plates, a revolvable arcuate knife mounted between said plates, and means to revolve said knife, said knife having a raised portion adapted to engage the seed to free the cutting edge of said knife.

21. A peach pitting knife comprising a holder, two curved blades carried thereby, said curved blades forming a loop between them, and means to cause said blades to approach and recede to and from closed position, said means being operative to vary the size of the loop after the same has been closed.

22. A fruit pitter comprising two opposed, pivotally connected blades, said blades having complementary recesses adapted to cooperate to receive the pit of fruit, spring means urging said blades into a slightly spaced relation but permitting them to be forced into contact with each other, an arcuate knife adapted to rotate through said recesses about the pit therein, and means for rotating said knife.

23. A fruit pitter comprising two opposed blades mounted for movement toward and away from each other, said blades being shaped to approximately fit around the pit of the fruit, means to operate said blades and arcuate pitting means arranged between said blades and normally lying substantially between parallel planes bounding the sides of said blades but arranged to rotate around said pit.

24. The method of seeding or coring fruit which has an annular section removed comprising holding the fruit from the interior by engaging the pulp adjacent the slice and forming a cut around the seed and pulp by a circular cut, the fruit being grasped on opposite sides of the annular section and making a circular cut with a rotary knife which is expanded to pass around the seed, and then drawing the rotary knife close to the seed to leave some of the pulp adhering to the seed.

In testimony whereof I have signed my name to this specification.

ARTHUR L. DUNCAN.